Nov. 2, 1971     A. DANIN     3,616,574
PARKING SPACE BARRIER
Filed Jan. 29, 1970
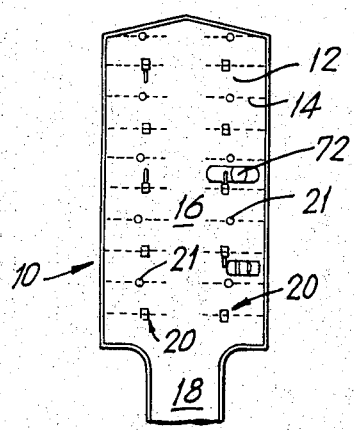
FIG.1
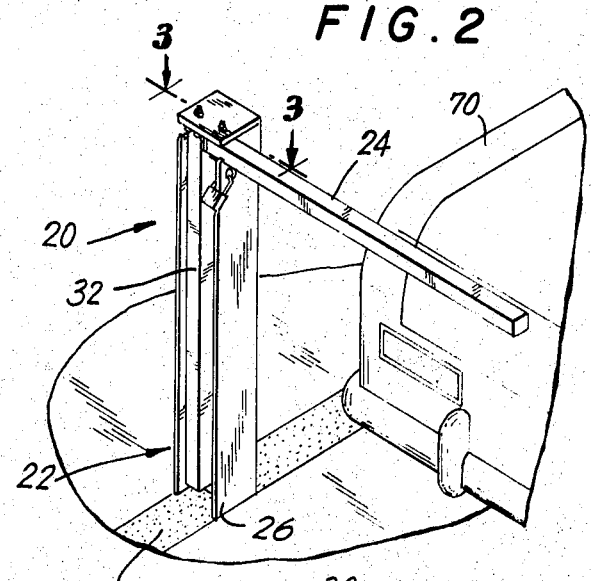
FIG.2
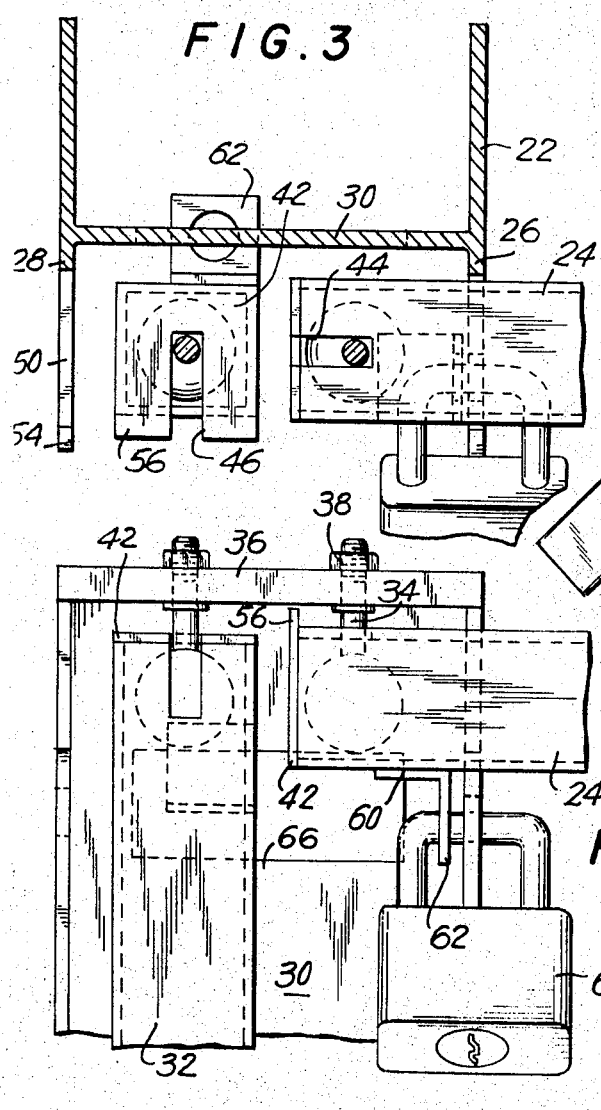
FIG.3
FIG.4
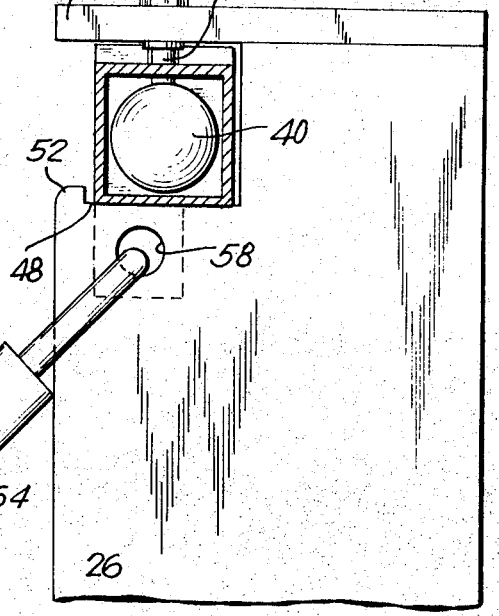
FIG.5
INVENTOR.
ALEX DANIN
BY
Steinberg & Blake
ATTORNEYS United States Patent Office 3,616,574
Patented Nov. 2, 1971

3,616,574
PARKING SPACE BARRIER
Alex Danin, 108 Mamaroneck Ave.,
White Plains, N.Y. 10603
Filed Jan. 29, 1970, Ser. No. 6,762
Int. Cl. F01f 13/00
U.S. Cl. 49—35
7 Claims

ABSTRACT OF THE DISCLOSURE

A parking space barrier for preventing unauthorized use of a parking space. The barrier includes a barrier arm which has a blocking position extending at least partly transversely across and over a parking space. The barrier has for this barrier arm a support structure which supports the arm for movement from a non-blocking position hanging down between a pair of adjoining parking spaces first about a substantially horizontal axis in a vertical plane to a blocking elevation and then about a substantially vertical axis in a horizontal plane to its blocking position where the barrier arm is situated at an elevation high enough to clear the hood or trunk of an automobile while still being too low to clear the roof of an automobile.

BACKGROUND OF THE INVENTION

The present invention relates to parking space barriers.

It is common practice for owners of parking lots, whether they be independent parking lots or parking lots which form parts of buildings associated with the parking lots, to rent parking spaces to individuals who are to have the exclusive use of the rented parking space. However, if the rented parking space is unoccupied it will be possible for unauthorized individuals to drive cars into and out of the parking space, so that the lessee of the parking space may find it occupied when he wishes to enter the parking space. As a result it has become customary to post warning signs at such parking lots warning against unauthorized use of the parking spaces, but such signs are not an effective deterrent.

It is also known to provide barriers capable of obstructing entrance into a parking space, so that when such barriers are under the control only of the lessee of a given parking space, it does indeed become possible to prevent unauthorized use of a parking space. Such a barrier is shown, for example, in U.S. Pat. 3,066,431. However, while barriers of this latter type are indeed effective deterrents against unauthorized use of parking spaces, they nevertheless have certain limitations.

Thus, for example, a conventional parking space barrier arm must be swung into the space which is normally occupied by an automobile in the parking space. The result is that the barrier arm of such a conventional parking space barrier must necessarily be in its position of non-use when an automobile is in the parking space. It therefore becomes possible to swing the arm out against the automobile when the latter is in the parking space, which is a serious disadvantage since such a barrier arm can be maliciously swung against an automobile in a parking space. Furthermore, the use of the barrier arm of such a conventional device is limited to providing an obstruction only when a space is empty. It cannot function when an automobile is in the parking space in order to prevent removal of the automobile from the space, so that the barrier arm of such a conventional device cannot function also as a deterrent to an automobile thief.

Thus, while conventional parking space barriers do effectively prevent use of empty parking spaces, they nevertheless have certain drawbacks and limitations on the range of possible uses which might be made of such barriers.

SUMMARY OF THE INVENTION

It is accordingly a primary object of the present invention to provide a parking space barrier which cannot be swung against the side of an automobile normally occupying a parking space.

In addition, it is an object of the present invention to provide a parking space barrier having the capability not only of preventing entrance of an unauthorized vehicle into an empty parking space but also of preventing removal of a vehicle from the parking space.

Furthermore, it is an object of the present invention to provide a construction of the above type which is simple and rugged so that it will have a long operating life even though situated outside in a parking lot where it is exposed to the elements.

According to the invention the parking space barrier includes a barrier arm and a support means which supports the arm for movement between a non-blocking position hanging down at a location beside a parking space and a blocking position extending transversely at least part of the way across a parking space and situated thereover. The support means of the invention supports the barrier arm for movement from its non-blocking position first in a vertical plane situated at the side of a parking space until the barrier arm is in horizontal position at its blocking elevation and then the support means enables the barrier arm to be moved in a horizontal plane to its blocking position.

BRIEF DESCRIPTION OF DRAWINGS

The invention is illustrated by way of example in the accompanying drawings which form part of this application and in which:

FIG. 1 is a schematic top plan view of a parking lot having parking spaces and including the barriers of the invention;

FIG. 2 is a perspective illustration of a parking space barrier of the invention shown for one parking space in its blocking position and for an adjoining parking space in its non-blocking position with the parking lot and part of an automobile shown fragmentarily in FIG. 2;

FIG. 3 is a sectional plan view taken along line 3—3 of FIG. 2 in the direction of the arrows showing, at a scale which is enlarged as compared to FIG. 2, details of the parking space barrier of the invention, that one of the barrier arms of FIG. 3 which is in its blocking position being shown fragmentarily;

FIG. 4 is a front elevation of the upper part of the barrier which is illustrated in FIG. 3, FIG. 4 showing the entire upper portion of the barrier with the arm which is fragmentarily illustrated in FIG. 3 also being shown fragmentarily in FIG. 4; and FIG. 5 is a partly sectional side elevation of the upper part of the parking space barrier of FIGS. 3 and 4, FIG. 5 showing the structure as it appears from the right of FIG. 4 with the barrier arm itself being shown in section in FIG. 5.

DESCRIPTION OF PREFERRED EMBODIMENTS

Referring to FIG. 1, there is schematically shown therein a parking lot 10 having a plurality of parking spaces 12. The parking spaces 12 are separated from each other by the boundary lines 14. All of the parking spaces 12 have inner open ends communicating with a common aisle 16 which in turn is in line with the end 18 of the parking lot. This end 18 serves as an entrance into and exit from the parking lot.

Parking space barriers 20 according to the invention extend along both sides of the aisle 16 and are situated at alternate boundary lines 14 at each side of the aisle 16. It will be noted that the barriers 20 of the invention are situated somewhat inwardly from the extremities of the boundary lines 14 so as to leave room for automobiles to turn into and out of the parking spaces 12. Simple uprights or standards 21 are situated at those boundary lines 14 which are not provided with the barriers 20 of the invention, so that the several standards 21 alternate with the barriers 20 of the invention. Thus, each space 12 has on one of its boundary lines 14 a standard 21 and at the other of its boundary lines a barrier 20 of the invention. The standards 21 may take the form, for example, of simple I-beams extending upwardly to a height of approximately three and three-quarters feet, although hollow metal pipes or the like could also be used for this purpose. In either event these standards are embedded in and extend upwardly from the ground so that they cannot be removed.

The details of the parking space barriers 20 of the invention are illustrated in FIGS. 2–5. Thus, each barrier 20 includes a standard 22 which can be a channel beam but in the illustrated example takes the form of an I-beam, as is most clearly apparent from FIG. 3. This I-beam is embedded securely in the ground so that it cannot be removed and extends upwardly to a height of approximately three and three-quarters feet from the surface of the parking lot. FIG. 2 shows the standard 22 extending upwardly from a boundary line 14.

This standard 22 forms part of a support means for a barrier arm 24. The I-beam 22 has a pair of opposed vertical webs 26 and 28 interconnected by a transverse web 30, all of these webs extending vertically. The web 26 forms a web situated in a vertical plane which extends between a pair of adjoining parking lots, and the same is true of the web 28. On the other hand, the web 30 is situated in a vertical plane which extends transversely across the row of parking spaces. Each web 26 forms together with the web 30 a space for accommodating the barrier arm 24 as well as an adjoining barrier arm 32 when these arms are in their non-blocking positions. In these latter positions the support means supports the arms so that they simply hang vertically.

The support means of the invention includes for each arm a universal joint means operatively connected with the upper end of the barrier arm 24 or 32 when the latter hangs vertically in its non-blocking position. This universal joint means includes a vertically extending pin 34 which has a threaded shank extending through an opening formed in a horizontal web 36 which is fixed to and extends across the top ends of the vertical webs 26, 28, and 30. This pin 34 is fixed, as by a nut 38, to the horizontal web 36. The pin 34 fixedly carries at its bottom end a spherical ball member 40 made of any suitable metal, for example. Thus, such a ball member may be formed with a threaded bore into which a bottom threaded end of the pin 34 is threaded. However, the ball member 40 may be welded to the bottom end of the pin 34, if desired.

Each of the barrier arms 24 and 32 is in the form of an elongated metal tube of square cross-section in the illustrated example. Each of these tubes is closed at its opposite ends by a pair of flat metal end walls, and FIG. 4 shows an inner end wall 42 fixed to the inner end of the barrier arm 24. An identical wall 42 is fixed to the inner end of the arm 32 which is identical with the arm 24. When a barrier arm is in its blocking position, as shown for the arm 24 in the drawings, the top wall of the hollow tubular barrier arm has at the region of its inner end an elongated slot 44, shown most clearly in FIG. 3 for the arm 24, to accommodate the pin 34. The inner end wall 42 of each arm is formed with a slot or narrow notch 46 which forms a continuation of the slot 44. In this way it is possible for each arm on the one hand to be suspended from the ball member 40 of the universal joint while being swingable about the latter from the vertical non-blocking position to the horizontal blocking position. Each of the arms 24 and 32 may have a length of approximately three and three-quarters feet, the standard 22 itself having approximately the same height.

The vertical side webs 26 and 28 are respectively formed at the region of the universal joint with the horizontal arm-supporting edges 48 and 50. These edges 48 and 50 form part of the right-angle notches which are respectively formed at the upper forward regions of the side webs of each standard 22, the horizontal web 36 extending over these notches in a manner shown most clearly in FIGS. 2, 4 and 5. The depth of each of these notches is sufficiently great to accommodate a barrier arm. The horizontal arm-supporting edges 48 and 50 terminate at their front outer ends in upwardly extending relatively small projections 52 and 54. The inner end walls 42 of the arms 24 and 32 project upwardly beyond the top walls of the arms when the later are in their horizontal blocking positions so as to have projecting portions 56 which will engage the lower surface of the horizontal web 36.

Each of the side webs 26 and 28 is formed just beneath its horizontal arm-supporting edge 48 and 50 with a lock opening 58 one of which is clearly visible in FIG. 5. Each of the arms carries at its wall which is downwardly directed in the blocking position of the arm an angle member 60 having a leg 62 formed with an opening which becomes aligned with the opening 58 when each arm is in its blocking position, as shown for the arm 24 in the drawings. As a result it becomes possible to situate a releasable lock such as the padlock 64 in these aligned openings, thus providing a lock means for releasing locking each arm in its blocking position. The transverse web 30 is formed with an opening 66 for accommodating the leg 62 of the angle member 60 when each arm is in its non-blocking position.

In setting up the structure of the invention the several standards 21 will simply be embedded at their lower ends in the ground so as to be permanently connected thereto extending upwardly in the manner described above. The same is true of the standards 22 which form part of the support means of the barriers 20 of the invention.

The arms 24 and 32 are manufactured and assembled before being connected with the standards 22. Thus, when the arms are manufactured the universal joint structure is assembled therewith before the inner end walls 42 are fixed, as by welding, to the inner ends of the arms. Thus, before the inner end wall 42 is joined to the remainder of the arm the ball member 40 is introduced into the arm with the pin 34 extending through one of the slots 44 or 46, and then the end wall 42 is welded or otherwise fixed to the inner end of the tube of the barrier arm so as to close the latter. With the arm and universal joint thus assembled, the pin of the joint is extended upwardly through an opening of the horizontal plate or web 36 and the nut 38 is applied so as to assemble the entire barrier structure in this simple manner.

When a given parking space is not rented or at any other time when a barrier arm is to have a position of non-use, this arm is simply situated between the side webs 26 and 28 hanging downwardly from the ball member 40 of its universal joint, in the manner shown for the arm 32 in the example of FIGS. 2–5. When a given barrier arm is to be used, it is first swung with respect to the ball member 40 of the universal joint about a substantially horizontal axis which extends transversely across the parking spaces, so that in this way each arm will assume a horizontal position extending over the boundary line 14. When each arm is placed in this horizontal position it is at the elevation of the notch which has the arm-supporting edge 48. Now each arm may be swung over the projection 52, or the projection 54 in the case of web 28, into the notch so as to rest on the edge 48 or the edge 50 in the case of the arm 32. Therefore, after each barrier arm has first been swung upwardly about a substantially horizontal axis extending across a given parking space, it becomes possible to swing each arm about a vertical axis in a horizontal plane to its blocking position resting on an edge such as the edge 48 in the case of the arm 24. The top edge of the part 56 of the end wall 42 prevents downward swinging of each arm when it is in its blocking position. Once a given arm is located in its blocking position, it is a simple matter to provide the lock means 64 for releasably holding the arm in its blocking position.

It is particularly to be noted that when a barrier arm is in its non-blocking position hanging downwardly from the universal joint of the support means, it is not possible to swing the arm about a horizontal axis situated over the boundary line 14. Thus, it is not possible at this time to swing an arm upwardly into the space which is normally occupied by an automobile. The side walls or webs 26 and 28 prevent such swinging of the barrier arms. As a result of the presence of these walls it is necessary first to swing each barrier arm about the horizontal axis which extends across the parking spaces, and it is after each barrier arm has reached its horizontal attitude that it is possible to swing the barrier arm about a vertical axis to its blocking position extending transversely and part of the way across each parking space.

For the sake of clarity the arm 24 of FIG. 2 is shown with a relatively short automobile 70 which can become located in its entirety between the inner end of the parking space and the arm 24. However, the height of the barrier arm 24, in its blocking position shown in FIG. 2, is such that it will clear the hood or trunk end of an automobile. Thus, referring to FIG. 1, there is schematically shown an automobile 72 which has been backed into a space 12 and which has a barrier arm situated over its hood. If this automobile 72 had been driven into the parking space in the opposite direction the barrier arm could be located over the trunk. However, the height of the barrier arm is such that it will not clear the roof of the automobile.

As a result of the above features of the invention, it is not possible to swing each barrier arm from its non-blocking position around a horizontal axis parallel to the line 14 so that the barrier arm could swing up against an automobile which is in the space. Furthermore, after an automobile is driven out of the space, the operator can very quickly place the barrier arm in its blocking position, thus preventing unauthorized entry into an empty space. Moreover, after an automobile has been driven into a space, the operator can, before leaving the automobile, place the barrier arm in its blocking position so that it will act as a deterrent against theft of the automobile. In other words, if a thief should consider it worthwhile to break into a parked automobile, such a thief certainly would not choose to break into an automobile which he could not drive out of the parking space because of the presence of a barrier arm, such as the arm 24, in its blocking position.

When it is desired to enter into or leave a parking space, it is a simple matter to remove the padlock 64, elevate the free end of the arm slightly so that the projection 56 will be lowered and so that the arm will clear the projection 52 (or the projection 54) and then the arm can be swung about the vertical axis to its position over the boundary line 14 after which the arm can be lowered to its non-blocking position. The standards 22 which are common to each pair of adjoining barrier arms provide identical supports for the pair of adjoining barrier arms, the only difference being that one barrier arm is swung about a vertical axis in one direction and the other barrier arm is swung about a vertical axis in the opposite direction, so that in this way a considerable economy in the supporting structure is achieved.

While specific examples are set forth above, it is clear that variations which are their full equivalent will readily occur to those skilled in the art and are included in the invention.

What is claimed is:

1. In a parking space barrier, a barrier arm, and support means supporting said arm for movement between a non-blocking position where said arm is vertical and situated at one side of a parking space and a blocking position where said arm extends at least partly across and is situated over a parking space, said support means being operatively connected with said barrier arm for supporting the latter for movement from said non-blocking position thereof first in a substantially vertical plane between adjoining parking spaces and then in a substantially horizontal plane from said vertical plane to said blocking position, said support means including a wall situated at one side of said arm when the latter is in said non-blocking position thereof for preventing said arm from moving in said horizontal plane to said blocking position until said arm has first moved in said vertical plane to a horizontal position for movement to said blocking position.

2. In a parking space barrier, a barrier arm, and support means supporting said arm for movement between a non-blocking position where said arm is vertical and situated at one side of a parking space and a blocking position where said arm extends at least partly across and is situated over a parking space, said support means being operatively connected with said barrier arm for supporting the latter for movement from said non-blocking position thereof first in a substantially vertical plane between adjoining parking spaces and then in a substantially horizontal plane from said vertical plane to said blocking position, said arm when in its non-blocking position hanging vertically and having an upper end portion operatively connected with said support means, said support means including a universal joint means operatively connected with said upper end portion of said arm for supporting the latter for swinging movement first about a substantially horizontal axis in said vertical plane from said non-blocking position at least approximately to a horizontal attitude and then about a substantially vertical axis in said vertical plane while swinging in said horizontal plane to said blocking position.

3. The combination of claim 2 and wherein said universal joint means includes a ball member and pin fixed thereto and extending upwardly therefrom to said support means to be fastened to the latter, said arm being hollow and having walls formed with slots receiving said pin for providing for said barrier arm said swinging movements.

4. In a parking space barrier, a barrier arm, and support means supporting said arm for movement between a non-blocking position where said arm is vertical and situated at one side of a parking space and blocking position where said arm extends at least partly across and is situated over a parking space, said support means being operatively connected with said barrier arm for supporting the latter for movement from said non-blocking position thereof first in a substantially vertical plane between adjoining parking spaces and then in a substantially horizontal plane from said vertical plane to said blocking position, a pair of said barrier arms being located between a pair of adjoining parking spaces in non-blocking positions hanging down from said support means and respectively having upper end portions operatively connected with said support means, said support means coacting with both of said arms for supporting them for individual movement first in said vertical plane from said non-blocking position of each arm and then in said horizontal plane with one arm swinging in said horizontal plane in one direction to a blocking position extending over one parking space and the other arm swinging in said horizontal plane in an opposite direction to a blocking position extending transversely across the adjoining parking space.

5. In a parking space barrier, a barrier arm, and support means supporting said arm for movement between a non-blocking position where said arm is vertical and situated at one side of a parking space and a blocking position where said arm extends at least partly across and is situated over a parking space, said support means being operatively connected with said barrier arm for supporting the latter for movement from said non-blocking position thereof first in a substantially vertical plane between adjoining parking spaces and then in a substantially horizontal plane from said vertical plane to said blocking position, said support means including a standard extending upwardly from the ground of a parking lot at a line situated at one side of a parking space, said standard having at least one web extending upwardly from the ground and situated substantially in a vertical plane extending along a side of a parking space, said support means having a horizontal upper web fixed to said one web and extending therefrom in a direction away from said parking space, universal joint means forming part of said support means and carried by said horizontal web beneath the latter and at the side of said one web opposite from the parking space, said one web having in the region of said universal joint means a horizontal edge on which said arm is supported when in said blocking position thereof extending horizontally from said universal joint means and resting on said edge of said one web, said one web preventing said arm from reaching said blocking position thereof until said arm is first swung in a substantially vertical plane longitudinally of the parking space to a substantially horizontal attitude where said arm can be swung over said supporting edge of said one web to rest thereon in said blocking position.

6. The combination of claim 5 and wherein said one web is formed just beneath said edge thereof with an opening, said arm carrying a lock member having an opening aligned with said web opeing when said arm is in said blocking position thereof, so that a releasable lock can be passed through the aligned openings to hold said arm releasably in said blocking position thereof.

7. The combination of claim 6 and wherein said support means includes at least one transverse web extending substantially perpendicularly from said one web and formed with an opening which receives said lock member which is fixed to said arm when the latter hangs down in its non-blocking position.

References Cited

UNITED STATES PATENTS

| | | | |
|---|---|---|---|
| 2,015,607 | 9/1935 | Shinn | 49—35 X |
| 2,588,502 | 3/1952 | Dunn | 49—35 |
| 2,737,740 | 3/1956 | Genoe | 49—131 X |
| 3,161,275 | 12/1964 | Sullivan | 49—131 X |
| 3,417,508 | 12/1968 | Sprung | 49—35 |

DENNIS L. TAYLOR, Primary Examiner

U.S. Cl. X.R.

49—49